United States Patent
Mattila et al.

(10) Patent No.: US 8,373,345 B2
(45) Date of Patent: Feb. 12, 2013

(54) CONTROL OF THE LIGHTING OF AN ELEVATOR CAR

(75) Inventors: Tatu Mattila, Helsinki (FI); Timo Syrman, Hyvinkää (FI); Seppo Ketoviita, Hyvinkää (FI)

(73) Assignee: Kone Corporation, Helsinki (FI)

( * ) Notice: Subject to any disclaimer, the term of this patent is extended or adjusted under 35 U.S.C. 154(b) by 279 days.

(21) Appl. No.: 12/614,284

(22) Filed: Nov. 6, 2009

(65) Prior Publication Data

US 2010/0066248 A1   Mar. 18, 2010

Related U.S. Application Data

(63) Continuation of application No. PCT/FI2008/000049, filed on Apr. 2, 2008.

(30) Foreign Application Priority Data

May 8, 2007  (FI) ...................................... 20070359

(51) Int. Cl.
*B60Q 1/14* (2006.01)
(52) U.S. Cl. ............ 315/77; 315/76; 315/291; 362/481; 187/414
(58) Field of Classification Search .................. 315/291, 315/76, 77; 362/481; 187/414
See application file for complete search history.

(56) References Cited

U.S. PATENT DOCUMENTS

| | | | |
|---|---|---|---|
| 1,832,454 A | 11/1931 | Gale | |
| 3,110,879 A | 11/1963 | Nikazy | |
| 5,744,961 A | 4/1998 | Otaka | |
| 6,076,638 A | 6/2000 | Gertz | |
| 6,969,958 B2 * | 11/2005 | Henry | 315/291 |
| 7,143,001 B2 * | 11/2006 | Karasek | 702/141 |
| 2004/0188182 A1 | 9/2004 | Walters et al. | |
| 2005/0264239 A1 * | 12/2005 | Endo | 315/224 |

FOREIGN PATENT DOCUMENTS

| | | | |
|---|---|---|---|
| GB | 1392951 | | 5/1975 |
| JP | 8-73133 A | | 3/1996 |
| JP | 8-245090 A | | 9/1996 |
| JP | 8245090 | * | 9/1996 |
| JP | 11-71078 A | | 3/1999 |
| JP | 2007-84228 A | | 4/2007 |

OTHER PUBLICATIONS

Machine translation of JP8245090.*

* cited by examiner

*Primary Examiner* — Jacob Y Choi
*Assistant Examiner* — Anthony Arpin
(74) *Attorney, Agent, or Firm* — Birch, Stewart, Kolasch & Birch, LLP

(57) ABSTRACT

The invention relates to a control (7) of the lighting of an elevator car (3) as well as to a method for controlling the lighting of an elevator car. The lighting of an elevator car according to the invention is controlled at least partly on the basis of information about a change in the speed of the elevator car.

11 Claims, 3 Drawing Sheets

US 8,373,345 B2

CONTROL OF THE LIGHTING OF AN ELEVATOR CAR

This application is a Continuation of co-pending Application No. PCT/FI/2008/000049 filed on Apr. 2, 2008, and for which priority is claimed under 35 U.S.C. §120; and this application claims priority of Application Ser. No. 20070359 filed in Finland on May 8, 2007 under 35 U.S.C. §119(a), the entire contents of all are hereby incorporated by reference.

FIELD OF THE INVENTION

The object of the invention is a control of the lighting of an elevator car and a method for controlling the lighting of an elevator car.

BACKGROUND OF THE INVENTION

An elevator car is conventionally illuminated with incandescent lamps, but also different types of fluorescent tubes and, nowadays, also e.g. LED illuminators are used in order to conserve energy.

In old elevator systems the lighting of the elevator car is always kept on. For energy-saving reasons, however, controls have been developed with which it is endeavored to always switch off the lighting when there are no passengers in the elevator car. This control arrangement results in the lamps of the elevator car being continuously extinguished and ignited.

Continuous extinguishing and igniting of the lamps shortens the lifetime of the lamps. For example, igniting an incandescent lamp generates an ignition current peak, which is caused by the fact that the resistance of a cold incandescent filament is low. As the incandescent filament warms the resistance grows and the current diminishes.

Light dimmers are also used in the lighting of an elevator system, in which case the lamps are never extinguished to be totally de-energized, and they do not ever cool completely. The aim is to reduce switching current peaks with this arrangement.

Publication US 2004/0188182 A1 discloses a control arrangement for conserving the energy of lighting. When an elevator is unused for 5 minutes, the lights and the fan are extinguished and are switched on again when the elevator has received a landing call. A problem of this solution is, on the one hand, that re-ignition of the lamps generates an ignition current peak, which weakens the lifetime of the lamps and, on the other hand, that the control of the lighting requires control feedback from the control of the elevator system, which complicates the structure of the control and makes installation more difficult.

Publication JP 8245090 presents a control arrangement of lighting, in which when the elevator car is empty the lights are dimmed in order to conserve energy. This solution also requires feedback from the control of the elevator system, in which case the structure of the control is complicated and e.g. retro-fitting the control in the elevator system is awkward.

Publication GB 1392951 A presents keeping the lighting of an elevator car extinguished when the elevator is standing unused and the delivery of the ready illuminated elevator car to the call floor for an order.

SUMMARY OF THE INVENTION

The purpose of the invention is to disclose a new kind of energy-saving control of the lighting of an elevator car, which operates without separate information from the control of the elevator system about when the elevator car is empty. The control of the lighting is thus easy to install in connection with the elevator car also after construction of the elevator, e.g. in connection with modernization. Furthermore, the control of the lighting according to the invention also eliminates switching current peaks, which prolongs the lifetime of the lamps.

The control of the lighting of an elevator car according to the invention is defined by the independent claims. Other features of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

The present invention relates to a control of the lighting of an elevator car. The control according to the invention can also be used for the control of the lighting of other such transport systems, in which the operating status of the transport system can be detected from a change in the speed of the transport appliance. These kinds of transport systems are e.g. an escalator system, a travelator and a crane system.

The lighting of an elevator car refers here to both separate lamps, such as incandescent lamps, fluorescent tubes and LED illuminators, as well as to the wiring connected to the lighting and the connections of the wiring and the lamps, such as the lamp sockets.

In the control of the lighting of an elevator car according to the invention the lighting of the elevator car is controlled at least partly on the basis of information about a change of the speed of the elevator car. A change of speed can be detected e.g. by measuring the speed of the elevator car and by determining the change of speed with differentiation. A change of speed can also be detected by measuring the acceleration of the elevator car e.g. with an acceleration sensor.

In one control of the lighting of an elevator car according to the invention the lighting of the elevator car is controlled at least partly on the basis of information about a change of the speed of the elevator car caused especially by a passenger of the elevator car. This information can be generated e.g. in connection with a person moving into the elevator car. In addition, movement of a person inside the elevator car can generate this type of information.

One control of the lighting according to the invention comprises a controllable power supply appliance for supplying power to the lighting of the elevator car. The power supply appliance comprises means for detecting a change in the speed of the elevator car, which means preferably comprise an acceleration sensor. The power supply appliance further comprises a main circuit and a control unit, which control unit comprises an input for the measuring signal of the acceleration sensor. The control unit is fitted to change with the power supply appliance the power supplied to the lighting with control criteria which are selected at least partly on the basis of measurement data received from the acceleration sensor. The power supply appliance can supply power to the lighting in a controlled manner e.g. as DC voltage or AC voltage. The frequency of the AC voltage can be the same as the frequency of the mains supply, e.g. 50 Hz, or the frequency can differ from this frequency.

The control unit can comprise e.g. a microcontroller, in which case the control is software-based, or the control unit can be constructed from, for instance, different IC circuits or in another way, such as with relay control. The control criteria can be recorded in the memory of the microcontroller, or they can be in a separate, e.g. EEPROM, memory circuit or in another recording device.

One main circuit of a power supply appliance according to the invention contains at least one controlled switch. The control unit of the power supply appliance is fitted in connection with the switch to be controlled. The control unit comprises a switch control for supplying power to the lighting of the elevator car with the switch control. The controlled switch can be a semiconductor, such as a prior-art IGBT transistor or MOSFET transistor, or it can be a mechanical switch, such as a relay. In this case the control unit can comprise an output for the control signal for controlling the switch. The switch can be controlled by, for instance, prior-art PWM (pulse-width modulation) or PFM (pulse-frequency modulation).

In one embodiment of the invention the main circuit of the power supply appliance is fitted to be a buck regulator. A buck regulator in this context means any prior-art buck regulator whatsoever. On the other hand, the main circuit of the power supply appliance can also be fitted to be e.g. a prior-art inverter, in which case the output of the inverter comprises a variable amplitude AC voltage for the voltage supply of the lighting. If the supply voltage of the lighting is AC voltage, a triak can also be used as a switch in the main circuit of the power supply appliance.

In one embodiment according to the invention the control criteria comprises means for processing the measurement data of the acceleration sensor, as well as a first longer delay and a second shorter delay, both pre-defined, and a first limit value that is smaller in its absolute value and a second limit value that is larger in its absolute value. The control unit is fitted to reduce the power supplied to the lighting after the first delay from the time that the processed value of the measurement signal of the acceleration sensor falls below the first pre-defined limit value and to increase the power supplied to the lighting after the second delay from the time that the processed value of the measurement signal of the acceleration sensor exceeds the second pre-defined limit value. The means for processing the measurement data of the acceleration sensor can comprise e.g. a filter for filtering the connected high-frequency noise from the environment of the measurement signal of the acceleration sensor. The control unit can comprise e.g. a microcontroller, in which case the measurement signal can be read with the ND converter of the microcontroller and filtering can be implemented with the software of the microcontroller.

The power supply appliance according to the invention can comprise measurement of the current of the lighting as well as means for detecting a defect of the lighting on the basis of the measurement of the current. The measurement of the current can comprise e.g. a measuring resistor or a Hall sensor for determining current. A failure of the lighting can be detected e.g. such that when the incandescent filament of the lamp burns through, current ceases to travel to the lighting. On the other hand, if the lighting comprises a number of lamps connected in parallel, the failure of one or more lamps can cause a reduction in current, in which case the number of lamps that have failed can be detected on the basis of the magnitude of the current. Also any short-circuit in the lighting can be detected as a sudden increase in current.

The control unit according to the invention can comprise regulation of the current of the lighting with pre-defined control criteria. The control unit can set the current supplied to the lighting by changing the relative turn-on time of the controlled switch in the main circuit of the power supply appliance.

In one preferred embodiment of the invention the power supply appliance is integrated into a connection enclosure, which comprises an input interface for the mains voltage supply of the elevator system as well as an output interface for the lighting of the elevator car. Input interface and output interface in this context mean connection points to which the mains voltage supply and the lighting can be connected in a way that conducts electricity.

In one embodiment of the invention the control unit comprises an input for selecting control criteria, which control criteria comprise different criteria for regulating at least the power supply of an incandescent lamp, a LED illuminator as well as a fluorescent tube. On the basis of the control criteria it is possible to e.g. change the turn-on time of the controlled switch in the main circuit of the power supply appliance, in which case the supply voltage of the lighting can be suitably selected for the different lamps.

One power supply appliance according to the invention comprises an output for fault information of the power supply appliance. The output can be, for instance, a relay output that can be read with the elevator control system. The elevator control system in this context means generally the control electronics of the elevator, comprising the control electronics of both the elevator car and of the elevator group.

In the method for controlling the lighting of an elevator car a change in the speed of the elevator car is measured. Also in the method the lighting of the elevator car is controlled at least partly on the basis of information about a change in the speed of the elevator car.

In one method according to the invention the measurement signal of the acceleration sensor is measured with the control unit, and the power supplied to the lighting with the power supply appliance is changed by means of the control unit with control criteria, which are selected at least partly on the basis of the measurement data received from the acceleration sensor.

In one method according to the invention the control unit comprises means for processing the measurement data of the acceleration sensor, as well as a first longer delay and a second shorter delay, both pre-defined, as well as a first limit value that is smaller in its absolute value and a second limit value that is larger in its absolute value. In the method the measurement signal of the acceleration sensor is processed and the power supplied to the lighting is reduced after the first delay from the time that the processed value of the measurement signal of the acceleration sensor falls below the first pre-defined limit value. In the method the power supplied to the lighting is increased after the second delay from the time that the processed value of the measurement signal of the acceleration sensor exceeds the second pre-defined limit value.

In one method according to the invention the current supplied to the lighting is measured and on the basis of the current measurement any failure of the lighting is inferred. When a failure of the lighting is detected a fault notification can also be sent the servicing center.

ADVANTAGES OF THE INVENTION

With the invention at least one of the following advantages is achieved:
When a change in the speed of the elevator car is monitored and the lighting is controlled on the basis of the speed change information, it is possible to construct an independently operating control of the lighting, which does not need a separate control feedback from the control of the elevator system and is thus easy to install in the elevator car after construction of the elevator also, e.g. in connection with modernization.

When the lamps do not extinguish completely but instead only dim, the lamps do not cool too much and ignition current peaks, which shorten the operating life of the lamps, do not occur in connection with ignition of the lamps.

When control of the lighting is done with the control unit, the control criteria of the control of the lighting can be easily changed and e.g. the time delays of the control can be changed.

A failure of the lighting can be detected on the basis of the measurement of the current of the lighting, in which case it is possible to send accurate defect data to the servicing center e.g. such as about which lamp of the elevator car has failed and possibly the number of lamps that have failed.

If the control unit comprises regulation of the current of the lighting, the current can be accurately set, which prolongs the lifetime of the lamps and reduces energy consumption.

The power supply appliance can be integrated into a separate connection enclosure to facilitate installation.

The control unit of the power supply appliance of the control of the lighting can comprise different criteria e.g. for regulating the power supply of an incandescent lamp, a LED illuminator as well as a fluorescent tube, in which case the same power supply appliance can be used in connection with a number of different lighting solutions.

BRIEF DESCRIPTION OF THE DRAWINGS

In the following, the invention will be described in more detail with reference to the attached drawings, wherein.

DETAILED DESCRIPTION OF THE INVENTION

Figure 1:
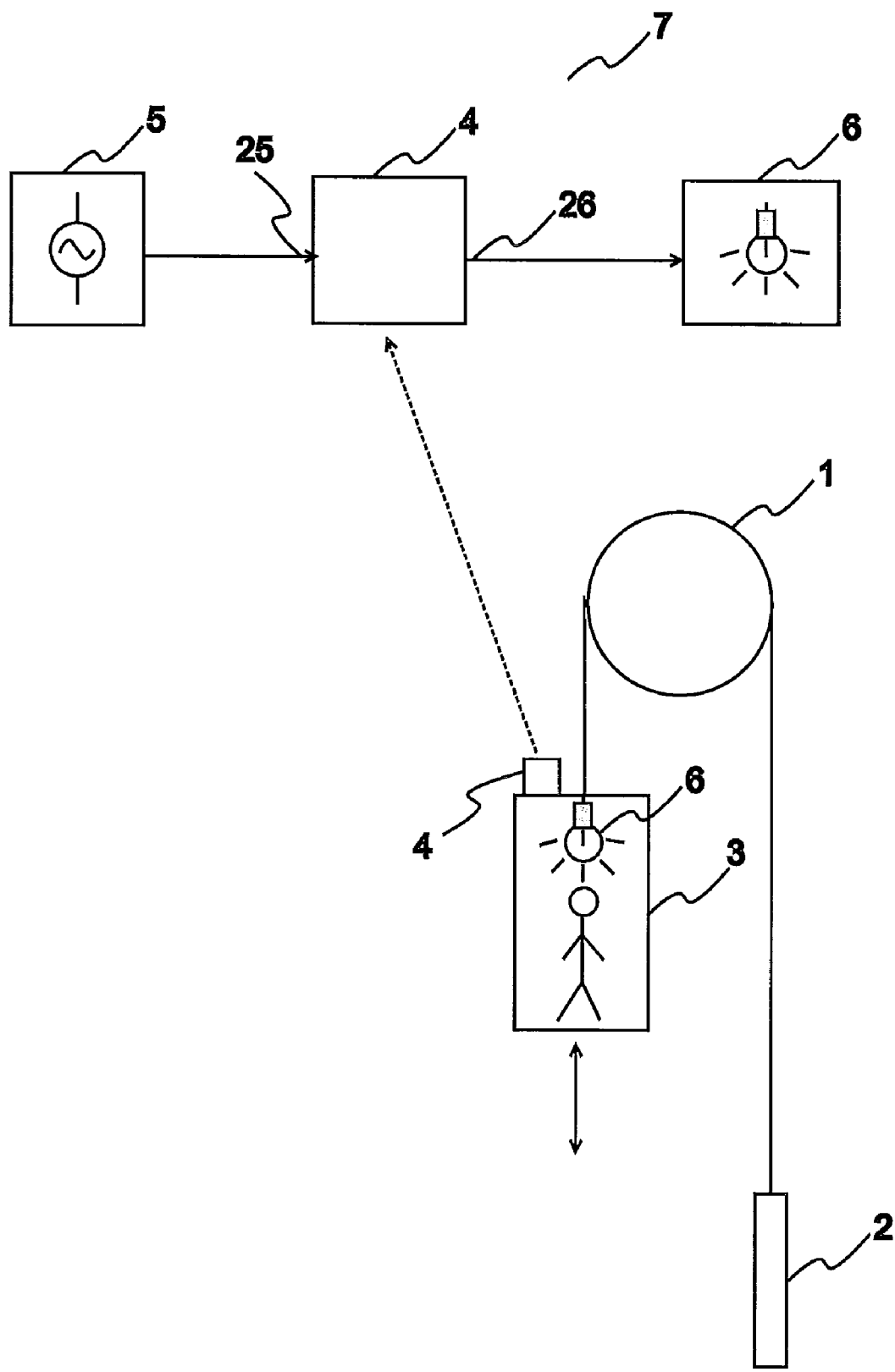
FIG. 1 presents a control of the lighting of an elevator car according to the invention

FIG. 1 presents a control 7 of the lighting of an elevator car according to the invention. The lighting is fitted into an elevator system, in which the elevator car 3 is moved with a motor 1. In this embodiment of the invention the elevator system also comprises a counterweight 2, but the elevator system can also be one without counterweight. The elevator car 3 contains a controllable power supply appliance 4. The power supply appliance contains an input interface 25 for the mains voltage supply 25 of the elevator system, via which the power supply appliance receives its energy. The power supply appliance also contains an output interface 26 for the lighting 6 of the elevator car, and the power supply appliance supplies power via the output interface in a controlled manner to the lighting of the elevator car.

Figure 2:
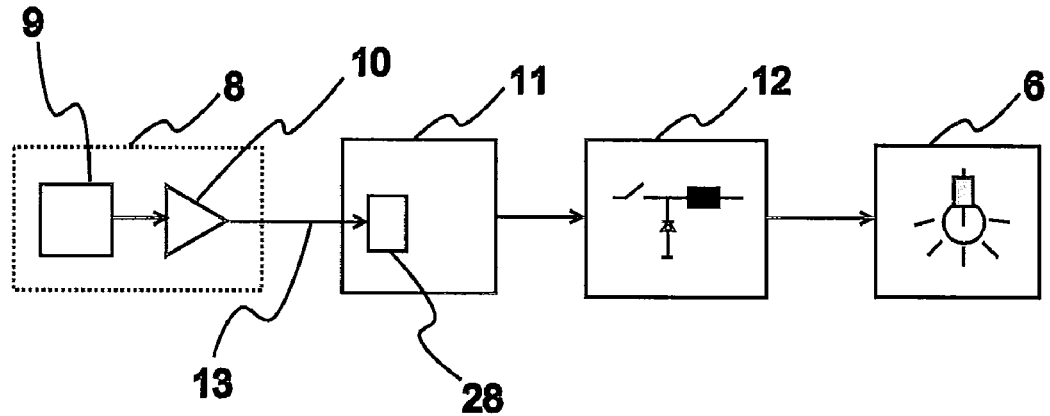
FIG. 2 presents a controlled power supply appliance according to the invention

FIG. 2 presents a controllable power supply appliance 4 according to the invention for supplying power to the lighting 6 of the elevator car. The power supply appliance comprises means 8 for detecting a change in the speed of the elevator car, which means comprise an acceleration sensor 9 as well as a measurement amplifier 10 of the measurement signal of the acceleration sensor. The power supply appliance 4 comprises a control unit 11, which comprises an input for the measuring signal 13 of the acceleration sensor. A microcontroller functions as the control unit, and the ND converter of the microcontroller functions as the input of the measurement signal 13. The measurement signal of the acceleration sensor is processed in the control unit with the means (28) for processing the measurement signal of the acceleration sensor. In this case the measurement signal is first filtered so that the high-frequency noise caused by the measuring environment is eliminated. After this the measurement signal is compared to the different control criteria 24 and on the basis of the control criteria power is supplied via the main circuit 12 of the power supply appliance to the lighting 6 of the elevator car.

Figure 3:
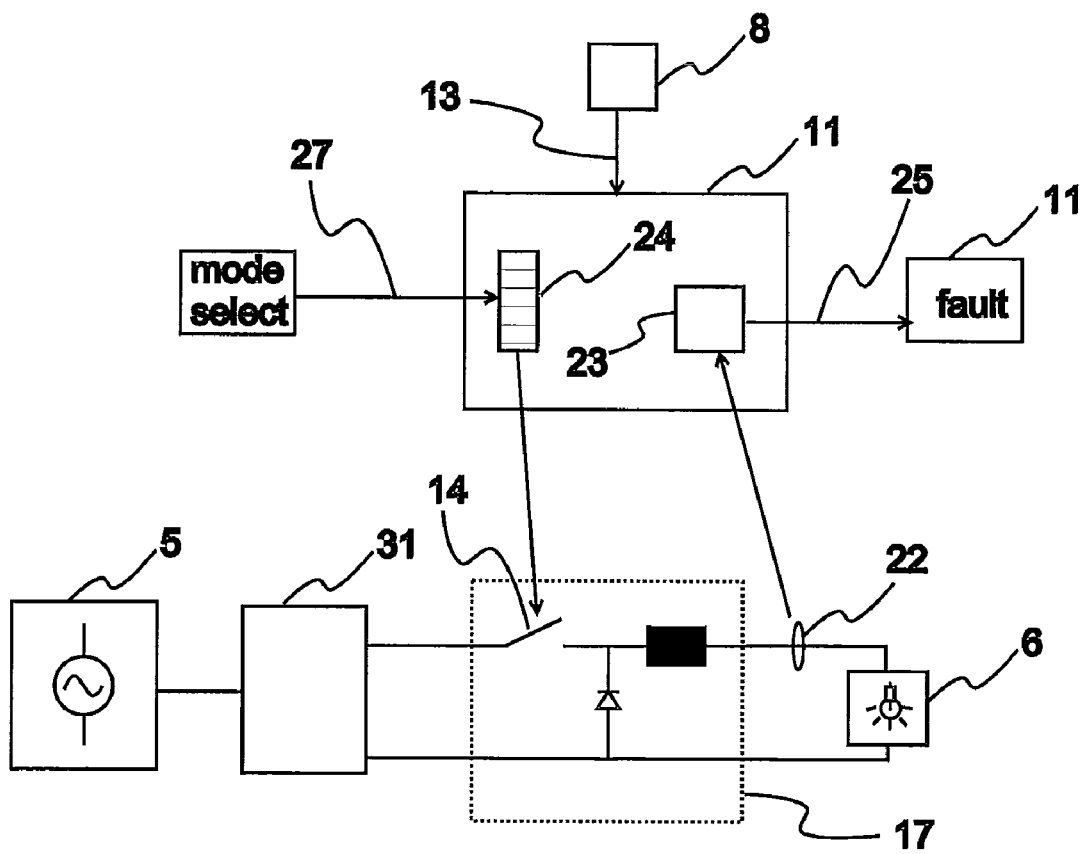
FIG. 3 presents a controlled power supply appliance according to the invention
Figure 4:
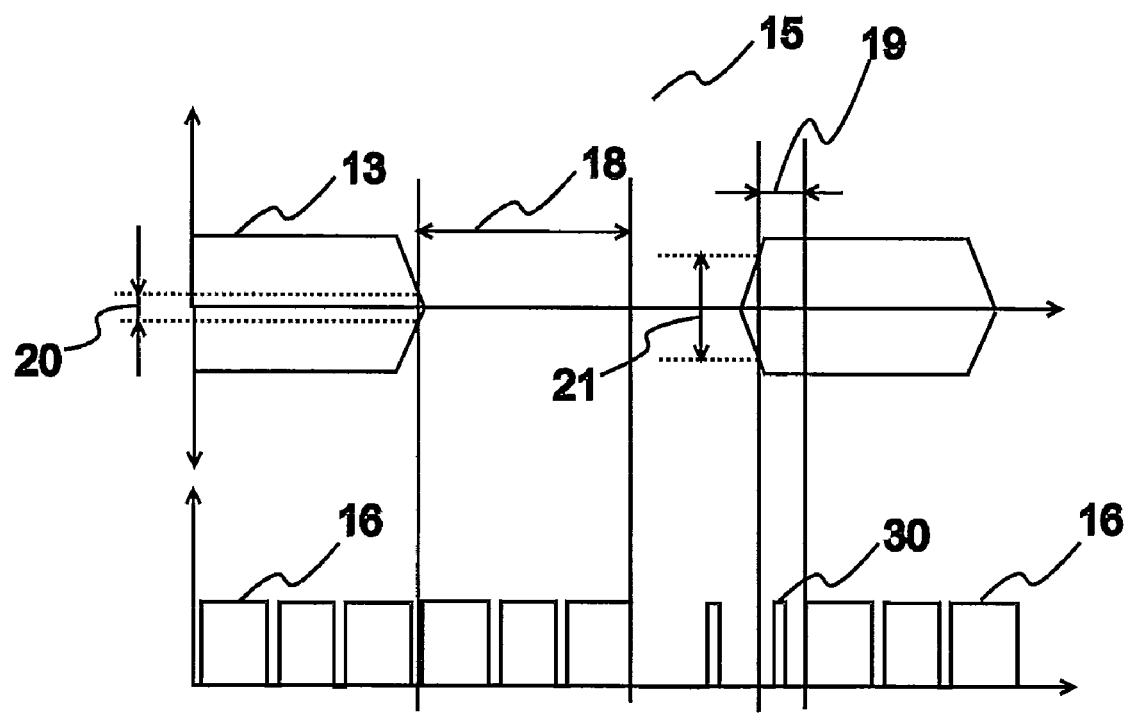
FIG. 4 presents a control of a power supply appliance according to the invention

FIG. 3 presents the interfaces of one power supply appliance according to the invention in more detail. FIG. 4 presents one control of a power supply appliance according to the invention. The power supply of the elevator system comes from the mains voltage supply 5, which is AC voltage. The voltage is rectified with a rectifier 31. Voltage is supplied from the rectifier to the main circuit of the power supply appliance, which is fitted to be a buck regulator 17. The buck regulator comprises a controlled switch 14, the opening and closing of which switch changes the voltage supplied to the lighting 6 of the elevator car. The control of the switch occurs with the control unit 11 fitted in connection with the switch. FIG. 4 presents the control signal 16, 30 of the switch, such that the switch conducts when the control signal deviates from zero. Increasing the relative turn-on time of the switch increases the output voltage of the buck regulator. The lighting of the elevator car is connected in parallel with this output voltage, so that increasing the voltage increases the supply power of the lighting, and reducing the voltage correspondingly reduces the supply power. The control unit 11 of the power supply appliance comprises an input 27 for selecting the control criteria 24. The power supply appliance comprises different control criteria for regulating at least the power supply of an incandescent lamp, a LED illuminator as well as a fluorescent tube. The control criteria include, among other things, information about how large the input voltage supplied to the different luminaire types is, i.e. what the relative conducting time of the switch 14 is with the different types of luminaires. The control criteria also include a first longer delay 18 and a second shorter delay 19, both pre-defined, as well as a first limit value 20 that is smaller in its absolute value and a second limit value 21 that is larger in its absolute value. When the processed value of the measurement signal 13 of the acceleration sensor falls below the first limit value 20, the control unit starts to measure the first delay 18. After the delay 18 has expired, the control unit 11 reduces the power supplied to the lighting 6 by shortening the relative conducting time of the switch 14 with the control 30. When the processed value of the measurement signal 13 of the acceleration sensor falls below the second limit value 21, the control unit starts to measure the second delay 19. After the delay 19 has expired, the control unit 11 increases the power supplied to the lighting 6 by lengthening the relative conducting time of the switch 14 with the control 16. Thus in practice the control operates so that when the acceleration sensor 9 detects vibration of the elevator car, the control unit reacts to the change with certain control criteria and brightens the lights of the elevator car. Correspondingly, with certain control criteria, such as the expiry of a time delay from when vibration is no longer detected in the elevator car, the control unit reacts by dimming the lights of the elevator car. The first time delay 18 is preferably longer than the second time delay 19, which delay can also be zero. In this case dimming of the lights occurs always on expiry of a longer time delay than ignition of the lamps.

The power supply appliance 4 can also comprise a measurement 22 of the current of the lighting as well as regulation of the current of the lighting. In this case the control unit 11 can set the current supplied to the lighting by changing the relative conducting time of the switch 14 with the pre-defined control criteria. The power supply appliance can also comprise means 23 for detecting a defect of the lighting on the basis of the measurement of the current. Further, the power supply appliance can comprise an output 25 for the defect signal 11, which defect signal can contain information about a failure of the lighting as well as more detailed information e.g. about how many lamps have failed. The invention is further described with the aid of a few examples of its embodiment. It is obvious to the person skilled in the art that the invention is not limited to the embodiments described above, but that many other applications are possible within the scope of the inventive concept defined by the claims presented below.

The invention claimed is:

1. A lighting control apparatus, comprising: a main circuit which alters the power supplied to the lighting of an elevator car; an acceleration sensor for detecting a change in the speed of the elevator car; and a control unit including a processor that processes the measurement signal from the acceleration sensor, and controls the main circuit to change the power supplied to the lighting based on a comparison between the processed measurement signal and predefined control criteria, wherein the lighting control apparatus is integrated into a connection enclosure housing that provides an input interface for a main voltage supply of the elevator system and an output interface for the lighting of the elevator car, wherein the connection enclosure hosing is attached to the elevator car.

2. A lighting control apparatus according to claim 1, wherein the main circuit includes at least one switch, the opening and closing of which alters the voltage supplied to the lighting; and
wherein the control unit controls the opening and closing of the switch based on a comparison between the processed measurement signal and predefined control criteria.

3. A lighting control apparatus according to claim 1, wherein the main circuit is a buck regulator.

4. A lighting control apparatus according to claim 1, wherein the predefined control criteria includes:
a first delay and a second delay, the first delay longer than the second delay; and
a first limit value and a second limit value, the first limit value being smaller in its absolute value than the second limit value in its absolute value; and
wherein the control unit reduces the power supplied to the lighting after the first delay from the time that the processed value of the measurement signal of the acceleration sensor falls below the first pre-defined limit value and increases the power supplied to the lighting after the second delay from the time that the processed value of the measurement signal of the acceleration sensor exceeds the second pre-defined limit value.

5. A lighting control apparatus according to claim 1, further comprising means for measuring the current of the lighting; and
means for detecting a defect of the lighting on the basis of the measurement of the current.

6. A lighting control apparatus according to claim 5, wherein the control unit regulates the current of the lighting to adjust the current supplied to the lighting based on pre-defined control criteria.

7. A lighting control apparatus according to claim 1, wherein the control unit includes an input for selecting pre-defined control criteria, the predefined control criteria including different criteria for regulating at least the power supply of an incandescent lamp, a LED illuminator, and a fluorescent tube.

8. A lighting control apparatus according to claim 5, further comprising an output for the defect information acquired by the power supply appliance.

9. A method for controlling the lighting of an elevator car, comprising:
attaching a lighting control apparatus to the elevator car;
receiving elevator car measurements from an acceleration sensor, within the light control apparatus;
processing the received acceleration measurement signal to determine the speed or a change in the speed of the elevator car;
comparing the processed signal to control criteria; and
controlling the power supplied to the lighting of the elevator car at least partly on the basis of the comparison,
wherein the lighting control apparatus provides an input interface for a main voltage supply of the elevator system and an output interface for the lighting of the elevator car.

10. A method according to claim 9, further comprising:
measuring the current supplied to the lighting;
detecting possible failure of the lighting based on the current measurement; and
when a possible failure of the lighting is detected, sending a fault notification to a servicing center.

11. A method for controlling the lighting of an elevator car, comprising:
receiving elevator car measurements from an acceleration sensor attached to the elevator car;
processing the received acceleration measurement signal to determine the speed or a change in the speed of the elevator car;
comparing the processed signal to control criteria; and
controlling the power supplied to the lighting of the elevator car at least partly on the basis of the comparison,
wherein the control criteria includes a first delay and a second delay, the first delay being longer than the second delay, and a first limit value and a second limit value, the first limit value being smaller in its absolute value t-hen-than the second limit value in its absolute value; and
wherein the step of controlling the power supplied to the lighting includes:
reducing the power supplied to the lighting after the first delay from the time that the processed value of the measurement signal of the acceleration sensor falls below the first pre-defined limit value;
increasing the power supplied to the lighting after the second delay from the time that the processed value of the measurement signal of the acceleration sensor exceeds the second pre-defined limit value.

* * * * *